(12) United States Patent
Probst (10) Patent No.: US 11,008,238 B2
(45) Date of Patent: May 18, 2021

(54) MIXER SUPPORT ASSEMBLY FOR USE IN AN INTEGRATED COVER AND MIXER APPARATUS AND ANAEROBIC DIGESTER SYSTEM INCORPORATING SAME

(71) Applicant: Thomas H. Probst, Waukesha, WI (US)

(72) Inventor: Thomas H. Probst, Waukesha, WI (US)

(73) Assignee: Symphonic Water Solutions, Inc., Brookfield, WI (US)

( * ) Notice: Subject to any disclaimer, the term of this patent is extended or adjusted under 35 U.S.C. 154(b) by 413 days.

(21) Appl. No.: 15/926,622

(22) Filed: Mar. 20, 2018

(65) Prior Publication Data

US 2019/0292080 A1    Sep. 26, 2019

(51) Int. Cl.
*B01F 7/22*      (2006.01)
*B01F 15/00*     (2006.01)
*C02F 3/28*      (2006.01)

(52) U.S. Cl.
CPC .............. *C02F 3/2866* (2013.01); *B01F 7/22* (2013.01); *B01F 15/00681* (2013.01); *B01F 2215/0052* (2013.01); *C02F 2203/006* (2013.01)

(58) Field of Classification Search
CPC .... B01F 13/0049; B01F 7/16; B01F 3/04609; B01F 2215/0052; B01F 7/00733; C02F 3/28; C02F 3/1284
USPC ......................................... 210/242.2, DIG. 9
See application file for complete search history.

(56) References Cited

U.S. PATENT DOCUMENTS

| 1,912,595 A | 6/1933 | Schlenz |
| 1,989,589 A | 1/1935 | Fischer et al. |
| 2,520,540 A | 8/1950 | Green |
| 2,647,733 A | 8/1953 | Knowles et al. |
| 3,288,295 A | 11/1966 | Kelly |
| 3,535,236 A | 10/1970 | Travis |
| 3,802,673 A | 4/1974 | Ross |
| 3,846,517 A | 11/1974 | Ross |
| 3,856,272 A | 12/1974 | Ravitts |
| 3,874,175 A | 4/1975 | Winters |
| 3,933,628 A | 1/1976 | Varani |
| 4,236,721 A | 12/1980 | Pennock |
| 4,378,437 A | 3/1983 | Cook |

(Continued)

FOREIGN PATENT DOCUMENTS

| CA | 2252294 | 4/2000 |
| JP | 2003236581 | 8/2003 |

OTHER PUBLICATIONS

U.S. Appl. No. 13/775,892, filed Feb. 25, 2013, Probst.

*Primary Examiner* — Claire A Norris
(74) *Attorney, Agent, or Firm* — Reinhart Boerner Van Deuren P.C.

(57) ABSTRACT

A mixer support assembly for use in an integrated cover and mixer apparatus and anaerobic digester system incorporating same provided. The digester system includes a tank with an integrated cover and mixer apparatus which provides a completely or substantially gas tight enclosure for the collection of biogas. The integrated cover and mixer apparatus includes a cover, a mixer, and a mixer support assembly for supporting the mixer. The mixer support assembly includes a float ring and a support body that is selectively removable from the float ring. The support body is attached to the float ring by way of a clamping arrangement.

20 Claims, 8 Drawing Sheets

(56) References Cited

U.S. PATENT DOCUMENTS

| | | | |
|---|---|---|---|
| 4,422,771 A * | 12/1983 | Earhart | B01F 3/0857 |
| | | | 277/395 |
| 4,723,848 A | 2/1988 | Knight | |
| 4,956,100 A | 9/1990 | Mikkleson | |
| 5,005,724 A | 4/1991 | Imhof | |
| 5,384,033 A | 1/1995 | Matasovic | |
| 5,525,216 A | 6/1996 | Matasovic | |
| 5,534,141 A | 7/1996 | McAnaney et al. | |
| 5,851,066 A | 12/1998 | Nocifora et al. | |
| 5,861,095 A | 1/1999 | Vogel et al. | |
| 6,136,194 A | 10/2000 | Vogel et al. | |
| 6,241,221 B1 | 6/2001 | Wegner et al. | |
| 2007/0200262 A1 | 8/2007 | Hills | |
| 2009/0297412 A1 | 12/2009 | Harrison | |
| 2013/0284652 A1 | 10/2013 | Probst | |
| 2018/0065876 A1 | 3/2018 | Probst | |

\* cited by examiner

MIXER SUPPORT ASSEMBLY FOR USE IN AN INTEGRATED COVER AND MIXER APPARATUS AND ANAEROBIC DIGESTER SYSTEM INCORPORATING SAME

FIELD OF THE INVENTION

This invention generally relates to wastewater treatment, and more particularly to apparatuses used in the wastewater treatment process, and even more particularly to apparatuses associated with anaerobic digestion applications in wastewater treatment.

BACKGROUND OF THE INVENTION

As is readily understood and conventionally accepted, wastewater treatment is a critical aspect of environmental preservation. There continues to be an increased awareness of problems with water quality, particularly those caused by the discharge of wastewater from industrial and other sources. This awareness has resulted in a demand for improved equipment and methods to treat wastewater prior to discharging it into a sewer, surface water, or to other destinations for effluent discharge. While such treatment systems and methods are generally not required to produce potable water, the systems are increasingly required, by law, to enhance the quality of wastewater prior to discharging it as effluent.

One such type of wastewater treatment includes a process including an anaerobic digester, the contents of which are completely stirred creating what may be referred to as an anaerobic activated sludge process, or is also referred to as a contact process or complete mix process, with a treating agent such as microorganisms which are mixed in with the wastewater to be treated.

As part of such process, a mixing of the wastewater and treating agent must occur during the treatment process. Mixing is typically achieved via a motor with a mixing attachment, such as an impeller, attached to the motor. The mixing attachment is submerged in the wastewater mixture to allow it to spin and ultimately mix the wastewater mixture. This mixing is necessary to ensure a satisfactory reaction of the wastewater and treating agent.

In its most basic form, the anaerobic digester includes a tank which holds the wastewater and microorganisms of the process. Due to the out gassing which occurs as a result of the interaction between the microorganisms and the wastewater, a floating cover is placed over the wastewater and is connected to the periphery of the tank, in much the same way a swimming pool cover is used to cover a swimming pool. This cover is used to contain a majority of the gasses generated during the process. The gasses are then siphoned off by drawing a vacuum on the underside of the cover above the surface of the wastewater mixture.

The motor and its mixing attachment may be mounted to the bottom or side of the tank as is conventionally done, or as developed by the Applicant herein, may be embodied as a floating mixer and integrated with the cover as is shown and described in U.S. patent application Ser. No. 13/775,892 to Probst titled "Anaerobic Digester Apparatus With a Floating Mixer System Integrated With a Cover," the teachings and disclosure of which are incorporated herein in their entirety.

In the latter case above of an integrated cover and floating mixer arrangement, it is important to ensure that the assembly of the cover and floating mixer is such that an abundance of air cannot be drawn via the vacuum applied under the cover through the floating mixer or through its connection to the cover. Indeed, too much air drawn by the vacuum can introduce an intolerable amount of oxygen to the reaction occurring under the cover, and/or the resultant gasses discussed above.

Also, in the latter above of an integrated cover and floating mixer arrangement, it is important to ensure that the floating mixer or portions thereof may be readily disconnected from the remainder of the integrated cover and floating mixer arrangement, so as to allow for repair and/or replacement of the motor as needed.

The invention herein address both of the above challenges associated with integrated cover and floating mixer arrangements, as well as other challenges. These and other advantages of the invention, as well as additional inventive features, will be apparent from the description of the invention provided herein.

BRIEF SUMMARY OF THE INVENTION

In one aspect, the invention provides a mixer support assembly of an integrated cover and mixer apparatus for a digester system. An embodiment of a mixer support assembly according to this aspect includes a support body. The support body is arranged for supporting a mixer. The assembly also includes a float ring surrounding the support body. The float ring has at least one float. The assembly also includes a clamping arrangement for applying a clamping force against the support body in an axial direction to clamp the float ring to the support body.

In one embodiment according to this aspect, the support body includes an upper wall, a lower wall in spaced opposition to the upper wall, and a sidewall extending between the upper and lower walls. The upper wall, lower wall, and sidewall define an interior space, wherein the upper and lower walls each include an aperture. The apertures are aligned with one another to define a passageway through the support body.

In one embodiment according to this aspect, the float ring includes an upper shroud and a lower shroud, with the at least one float situated within a float space between the upper and lower shrouds. The float ring also includes a sidewall enclosing the at least one float between the upper and lower walls. The sidewall of the float ring includes an upper flange and a lower flange. The upper flange is connected to the upper shroud and the lower flange is connected to the lower shroud.

The clamping arrangement is formed by the lower flange of the sidewall of the float ring, a clamping ring, and at least one adjustment bolt for biasing the clamping ring towards the lower flange of the sidewall of the float ring. The at least one adjustment bolt is connected to the lower flange of the sidewall of the float ring. A peripheral region of the support body is interposed between the clamping ring and the lower flange of the sidewall of the float ring. The clamping ring is connected to the upper shroud of the float ring and biased against the upper wall of the support body via tightening of a nut on the at least one adjustment bolt.

In one embodiment according to this aspect, the mixer support assembly also includes a seal supported by the lower flange of the sidewall of the float ring. The seal is positioned on the lower flange such that it is interposed between the lower flange of the sidewall of the float ring and the lower wall of the support body. Tightening of the nut on the at least one adjustment bolt biases the lower flange of the sidewall of the float ring towards the lower wall and compresses the seal.

In another aspect, an integrated cover and mixer apparatus of an anaerobic digester system is provided. An embodiment of such an integrated cover and mixer apparatus includes a cover, a mixer, and a mixer support assembly supporting the mixer. The mixer support assembly includes a support body. The support body includes an aperture for passage of a portion of the mixer through the support body. The mixer support assembly also includes a float ring surrounding the support body and supporting the support body in an axial direction. The cover is attached to the float ring. The mixer support assembly also includes a clamping arrangement formed between the float ring and the support body. The support body is selectively removable from the float ring.

In one embodiment according to this aspect the support body includes an upper wall, a lower wall in spaced opposition to the upper wall, and a sidewall extending between the upper and lower walls. The upper wall, lower wall, and sidewall define an interior space. The float ring comprises an upper shroud, a lower shroud, at least one float situated within a float space between the upper and lower shrouds, and a sidewall enclosing the at least one float between the upper and lower walls. The sidewall of the float ring includes an upper flange and a lower flange. The upper flange is connected to the upper shroud, the lower flange connected to the lower shroud.

In one embodiment according to this aspect, the clamping arrangement is formed by the lower flange of the sidewall of the float ring, a clamping ring, and at least one adjustment bolt for biasing the clamping ring towards the lower flange of the sidewall of the float ring. The at least one adjustment bolt is connected to the lower flange of the sidewall of the float ring. A peripheral region of the support body is interposed between the clamping ring and the lower flange of the sidewall of the float ring. The clamping ring is connected to the upper shroud of the float ring and biased against the upper wall of the support body via tightening of a nut on the at least one adjustment bolt.

A seal is supported by the lower flange of the sidewall of the float ring. The seal is positioned on the lower flange such that it is interposed between the lower flange of the sidewall of the float ring and the lower wall of the support body. Tightening of the nut on the at least one adjustment bolt biases the lower flange of the sidewall of the float ring towards the lower wall and compresses the seal.

In yet another aspect, the invention provides a digester system. An embodiment of such a digester system includes a tank for containing a wastewater mixture. The tank has a sidewall. The system also includes an integrated cover and mixer apparatus. The integrated cover and mixer apparatus includes a cover attached to the sidewall of the tank a mixer, and a mixer support assembly. The mixer support assembly including a mixer support body and a float ring. The cover is attached to the float ring. The mixer is supported by the mixer support assembly. A portion of the mixer extends through the mixer support assembly and into a wastewater containment region of the tank. The mixer support assembly includes a removable support body. The mixer and support body are selectively removable from a float ring of the mixer support assembly as a unit such that the float ring remains attached to the cover and the cover remains attached to the sidewall of the tank.

In one embodiment according to this aspect, the mixer support assembly includes a clamping arrangement for clamping the float ring to the support body. A seal is situated between the support body and the float ring and is compressed by the clamping arrangement.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
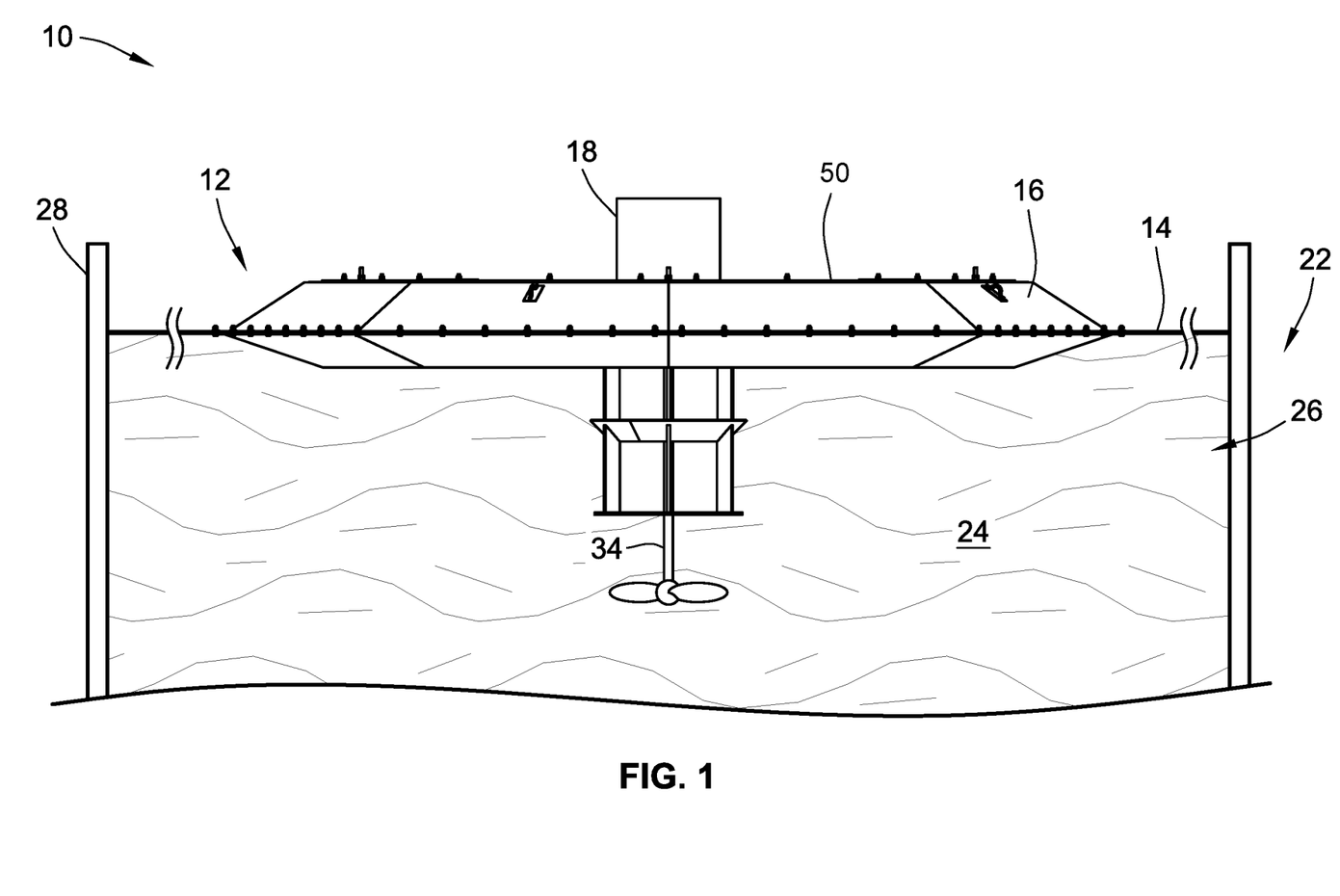
FIG. 1 is an exemplary embodiment of an anaerobic digester system according to the teachings herein.

Turning now to the drawings, a mixer support assembly for use in an integrated cover and mixer apparatus and anaerobic digester system incorporating same are shown and described. With particular reference to FIG. 1, an exemplary embodiment of a digester system 10 is illustrated. Digester system 10 includes an integrated cover and mixer apparatus 12. Integrated cover and mixer apparatus 12 includes a floating cover 14, a mixer support assembly 16, and a mixer 18 supported by mixer support assembly 16.

Digester system 10 includes a tank 22 for containment and treatment of a wastewater mixture 24 comprised of wastewater and a treating agent. Wastewater mixture 24 is contained within a wastewater containment region 26 of tank 22, which is bounded by a sidewall 28 of tank 22. The shape of tank 22 may take on any form expedient for wastewater treatment. The same holds true for the volume of tank 22, i.e. it may have any volume expedient for wastewater treatment.

Cover 14 is attached to sidewall 28 in such a way that the connection is substantially or completely gas tight. Such a configuration allows for the containment of biogas generated during the treatment of the wastewater with a treatment agent. This contained gas may then be siphoned off and used in, or contained for use in, other processes. The connection of cover 14 to sidewall 28 may be achieved via any known methodology in the contemporary art and thus is not limiting on the invention herein.

As will be described in greater detail below, cover 14 also attaches to mixer support assembly 16 to provide the integrated cover and mixer apparatus 12 previously introduced. This attachment of cover 14 to mixer support assembly 16 is also substantially or completely gas tight so that the tendency of biogas to escape from under cover 14 through its point of connection to mixer support assembly 16 is substantially reduced or entirely eliminated.

Mixer 18 is supported by mixer support assembly 16 such that a portion of mixer support assembly 16, particularly the mixer arm 34, may readily extend through mixer support assembly 16 and provide a mixing function to wastewater mixture 24. Mixer 18 may be embodied by any mixer useful in such an application and as such the particulars are not germane to the invention. The connection of mixer 18 to mixer support assembly 16 is a sealed connection such that this connection too is substantially or completely gas tight.

As may be surmised from inspection of FIG. 1, mixer support assembly 16 is buoyant enough to support its own weight and the weight of mixer 18 yet remain afloat. To this end, mixer support assembly 16 incorporates at least one float, which will be described below. Although not a requirement, cover 14 may also include its own floats (not shown) to assist in maintaining cover 14 afloat as well.

Figure 2:
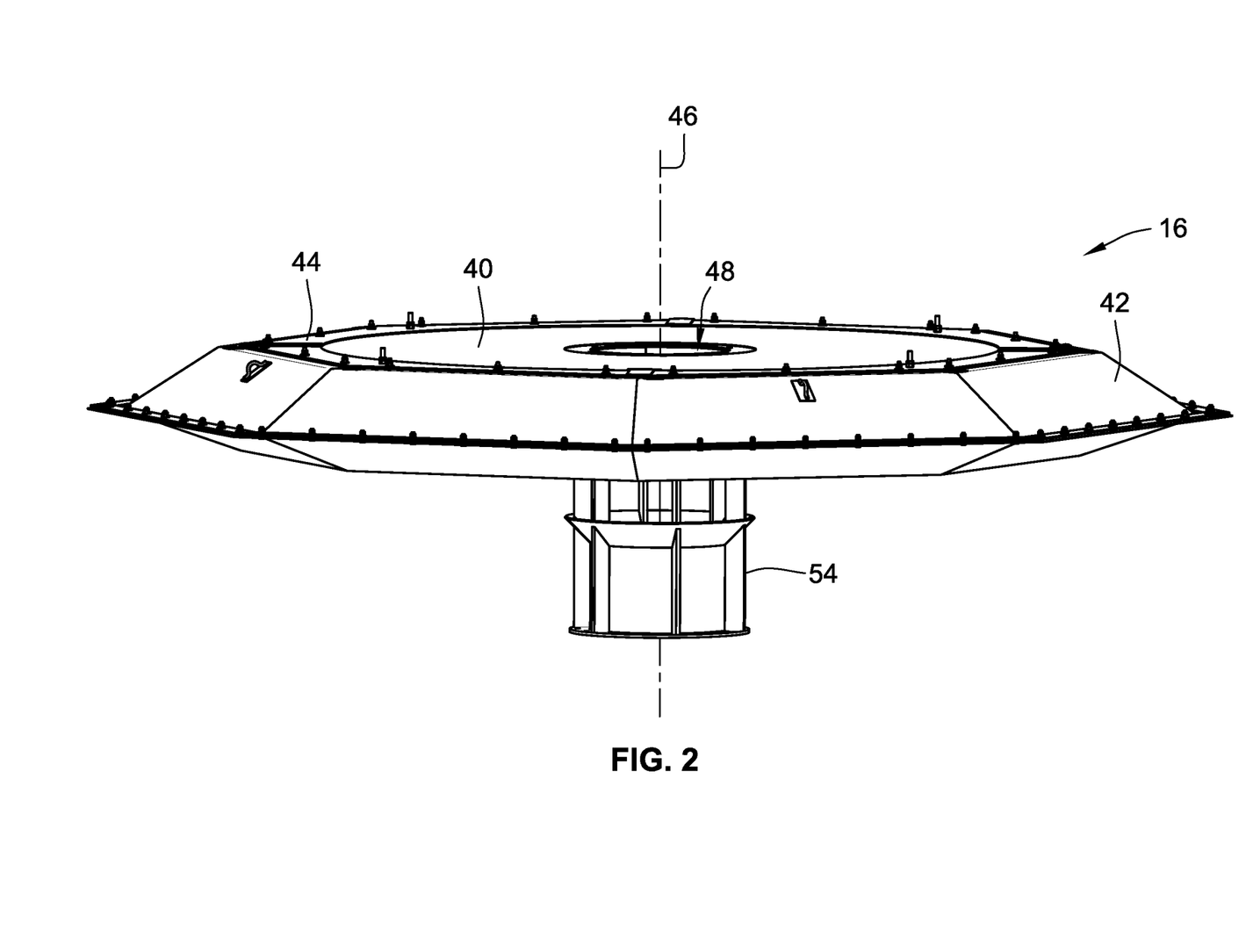
FIG. 2 is a perspective view of a mixer support assembly of the anaerobic digester system of FIG. 1.

Turning now to FIG. 2, the same illustrates mixer support assembly 16 disconnected from cover 14 shown in FIG. 1. Mixer support assembly 16 includes a support body 40 which is selectively removable from a float ring 42 of mixer support assembly 16. A clamping arrangement 44 which is partially shown in FIG. 2 is responsible for providing an axial clamping force between support body 40 and float ring 42. The term "axial" in this instance is meant to define any direction which is parallel to a longitudinal axis 46 defined by a passageway 48 formed through support body 40. Support body 40 also includes a mixer shroud 54 through which mixer arm 34 (see FIG. 1) is routed through.

Referring to FIG. 1, mixer 18 is axially mounted to an upper wall 50 of support body 40 (see FIG. 2). A gasket or other sealing device may be interposed between upper wall 50 and mixer 18 to substantially reduce or eliminate a leak path at the connection of these components.

Figure 3:
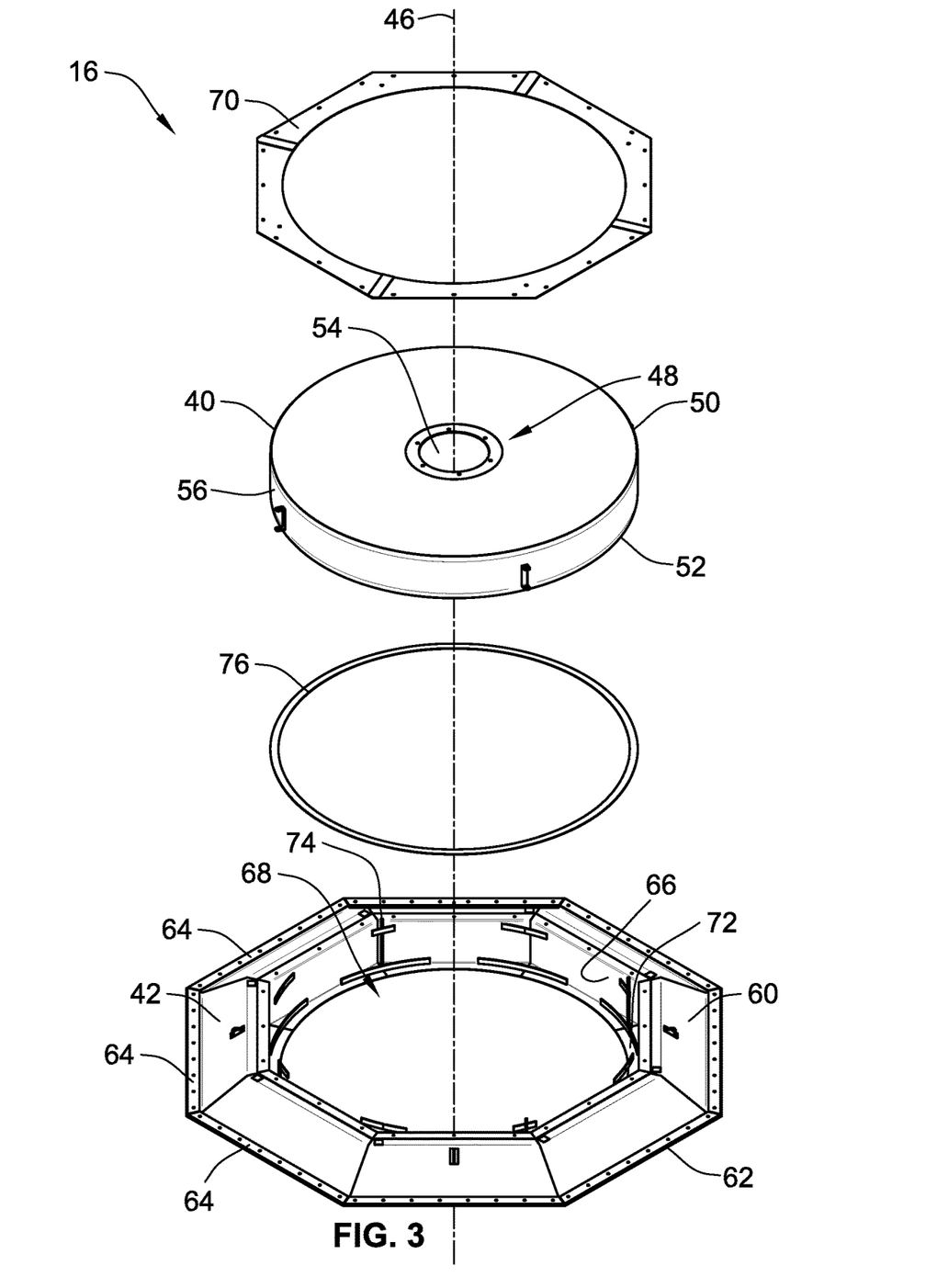
FIG. 3 is a perspective exploded view of the mixer support assembly of FIG. 2.

With reference to FIG. 3, the same illustrates mixer support assembly 16 in an exploded configuration. Support body 16 includes the previously introduced upper wall 50, a lower wall 52 in spaced opposition to upper wall 50, and a sidewall 56 arranged at the peripheries of upper and lower walls 50, 52. For purposes of description herein, the term "lower" is meant to define the side or portion of the illustrated embodiment which is closest to wastewater mixture 24 (see FIG. 1), while the term "upper" as used in this context is meant to define the side or portion which is farthest away from the wastewater mixture 24 (see FIG. 1).

Figure 5:
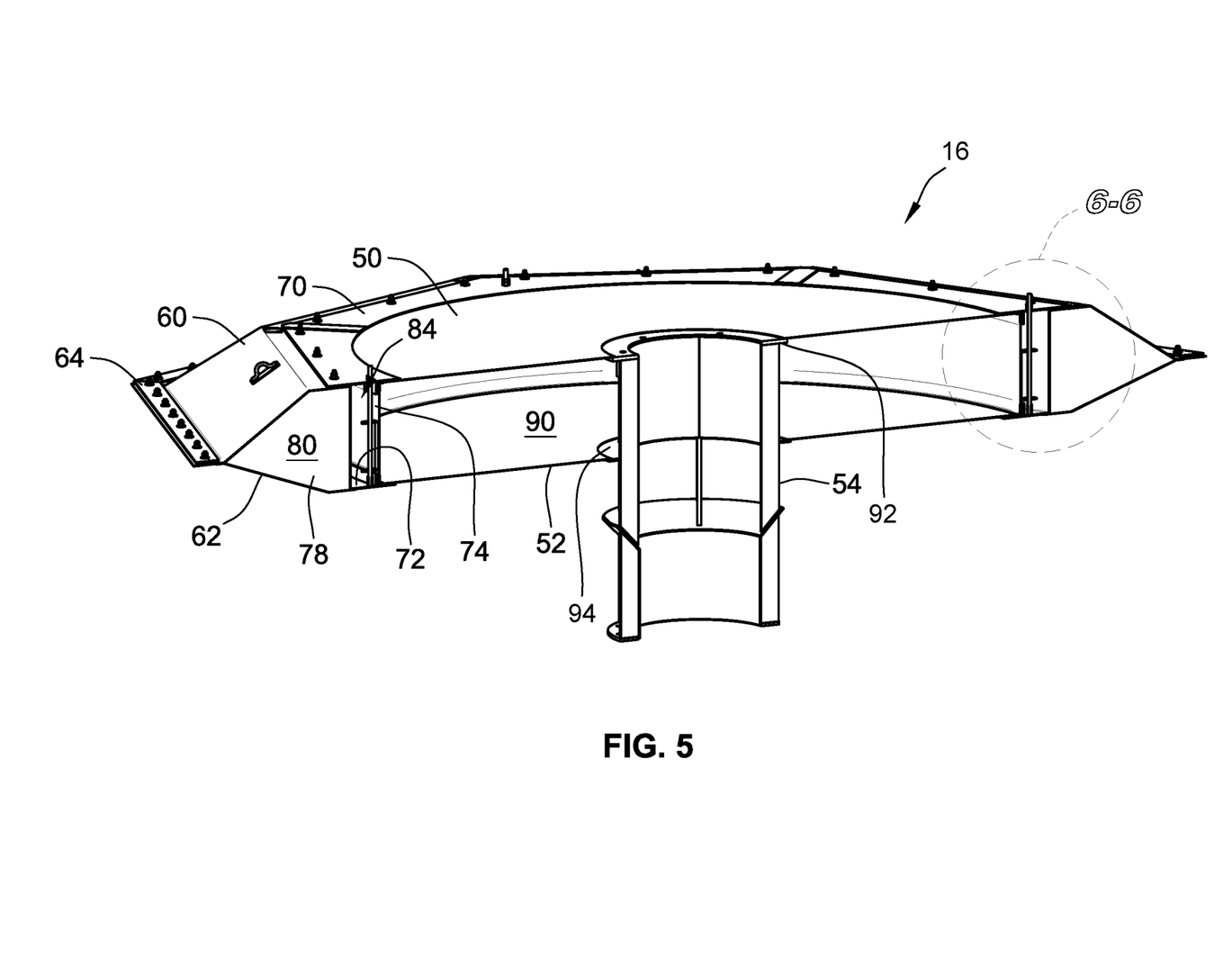
FIG. 5 is a perspective cross section of the mixer support assembly of FIG. 2.

Each of upper and lower walls 50, 52 includes an aperture (not labeled). These apertures are aligned with one another to define the aforementioned passageway 48. As will be discussed in greater detail below, mixer shroud 54 extends into passageway 48. Upper wall 50, lower wall 52, and sidewall 56 are assembled in such a way that an interior space is defined internally in support body 40 between these components as shown in FIG. 5 and described below.

Upper wall 50, lower wall 52, and sidewall 56 may be formed of any suitable material for this application. As one non-limiting example, the same may be formed of a lightweight metal alloy. These components may be welded together, or joined via any other mechanical joining expedient. One advantage of welding these components, however, is that this substantially reduces or entirely prevents the ingress of wastewater mixture 24 and/or biogas into the interior space introduced above.

Still referring to FIG. 3, float ring 42 includes an upper shroud 60 and a lower shroud 62 which converge toward one another such that their peripheral edges meet, a sidewall 66 connected to upper and lower shrouds 60, 62. A float space is defined between upper and lower shrouds 60, 62 and sidewall 66 and receives at least one float of float ring 42.

One or more mounting bars 64 are situated at the periphery of float ring 42 in the region where upper and lower shrouds 60, 62 meet one another. These bars 64 are used to exert an axial force against an edge of cover 14 in a central opening of cover 14 (see FIG. 1). In this way, mixer support assembly 16 is joined to cover. Bars 64 are arranged in configured to bias cover 14 against upper shroud 60 such that leakage of gas at this point of connection is substantially reduced or entirely eliminated. In other words, a seal is formed via the sheer pressure exerted by bars 64 against cover 14. Alternatively, a seal may be employed in this region as needed to enhance sealing functionality. Bars 64 may be a plurality of segments as shown, or may be a single ring in the alternative.

Mixer support assembly 16 also includes a clamping arrangement formed between support body 40 and float ring 42. This clamping arrangement is formed via a clamping ring 70, a lower flange 72 of sidewall 66, and at least one adjustment bolt 74 as shown. The particulars of this clamping arrangement are discussed below relative to FIGS. 5-8. The clamping arrangement operates to clamp a peripheral region of support body 40 between clamping ring 70 and lower flange 72 within an opening 68 of float ring 42 via tightening a nut on the at least one adjustment bolt 74. A seal 76 may also be provided between lower flange 72 and lower wall 52 of support body 40 to substantially reduce or entirely eliminate a leak path between support body 40 and float ring 42.

Figure 4:
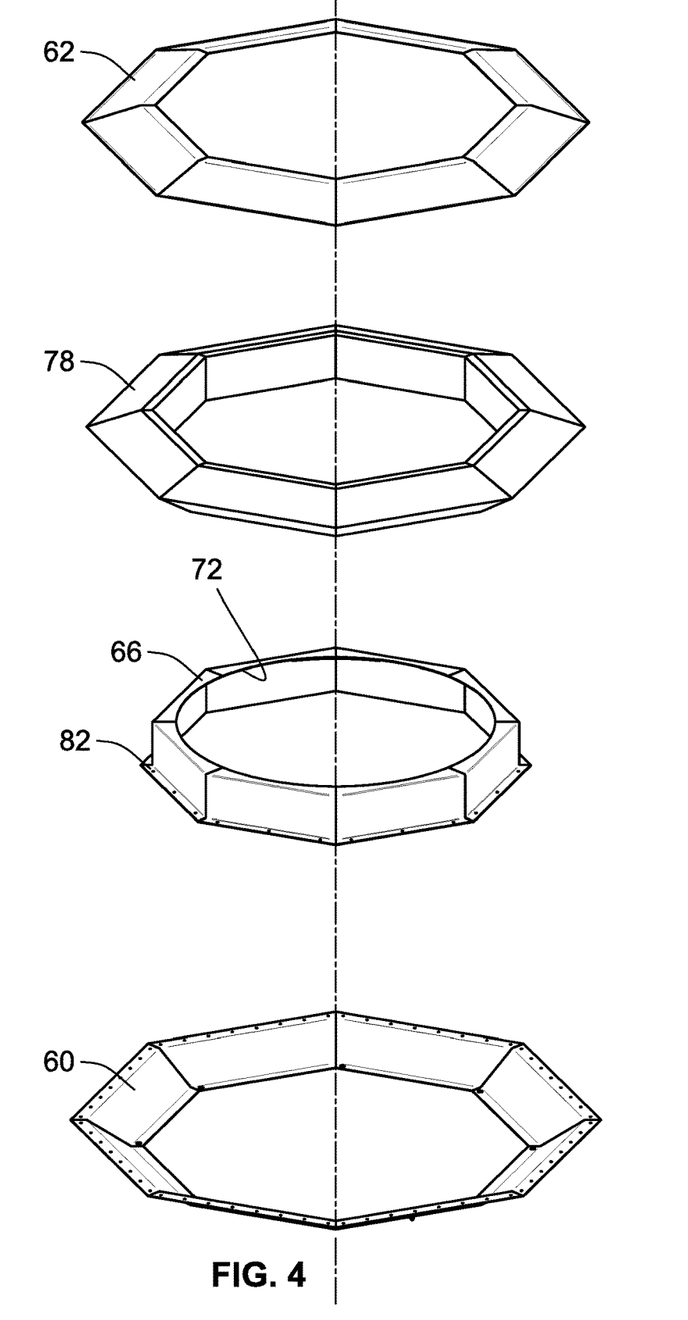
FIG. 4 is a perspective exploded view of a float ring of the mixer support assembly of FIG. 2.

Turning now to FIG. 4, the same illustrates float ring 42 (see FIG. 3) in an exploded view. Upper and lower shrouds 60, 62 are formed elements. It is contemplated that either of shrouds 60, 62 may be formed from a single piece of material, or may be formed by joining a plurality of segments together. In either case, shrouds 60, 62 and sidewall 66 may be formed of any suitable material for this application. As one non-limiting example, the same may be formed of a lightweight metal alloy. These components may be welded together, or joined via any other mechanical joining expedient. One advantage of welding these components, however, is that this substantially reduces or entirely prevents the ingress of wastewater mixture 24 (see FIG. 1) and/or biogas into the interior space introduced above.

As introduced above, a float 78 is interposed between upper and lower shrouds 60, 62 and may be formed as a single continuous piece of floatation material, or a plurality of separate float segments arranged adjacent to one another between upper and lower shrouds 60, 62. The material used for float 78 may be any material useful for such applications.

Also as introduced above, sidewall 66 includes a lower flange 72 which extends in a radial direction inwardly as shown. The term "radial" as used in this context is meant to define any direction perpendicular to the axial direction defined above. Sidewall 66 also includes an upper flange 82 which extends in the radial direction outwardly, i.e. opposite the direction of extension of lower flange 72. The inward radial extension of lower flange 72 is overlapped by a portion of lower shroud 62. The outward radial extension of upper flange 82 overlaps a portion of upper flange 60. These regions of overlap provide an area of connection between sidewall 66 and upper and lower shrouds 60, 62. This connection may be achieved by welding or any other mechanical joining methodology. By use of welding at this overlap, a potential leak path of biogas through the mixer support assembly 16 (see FIG. 1) is reduced or eliminated.

Turning now to FIG. 5, the same illustrates a cross section of mixer support assembly 16. The previously introduced interior space 90 between upper and lower walls may be seen in this view. Mixer shroud 54 extends into this interior space 90. Mixer shroud 54 includes an upper flange 92 and a lower flange 94. Upper flange 92 is connected to an interior side of upper wall 50 by welding or any other mechanical joining technology. Lower flange 94 is connected to an exterior side of lower wall 52 via welding or any other mechanical joining technology.

Figure 6:
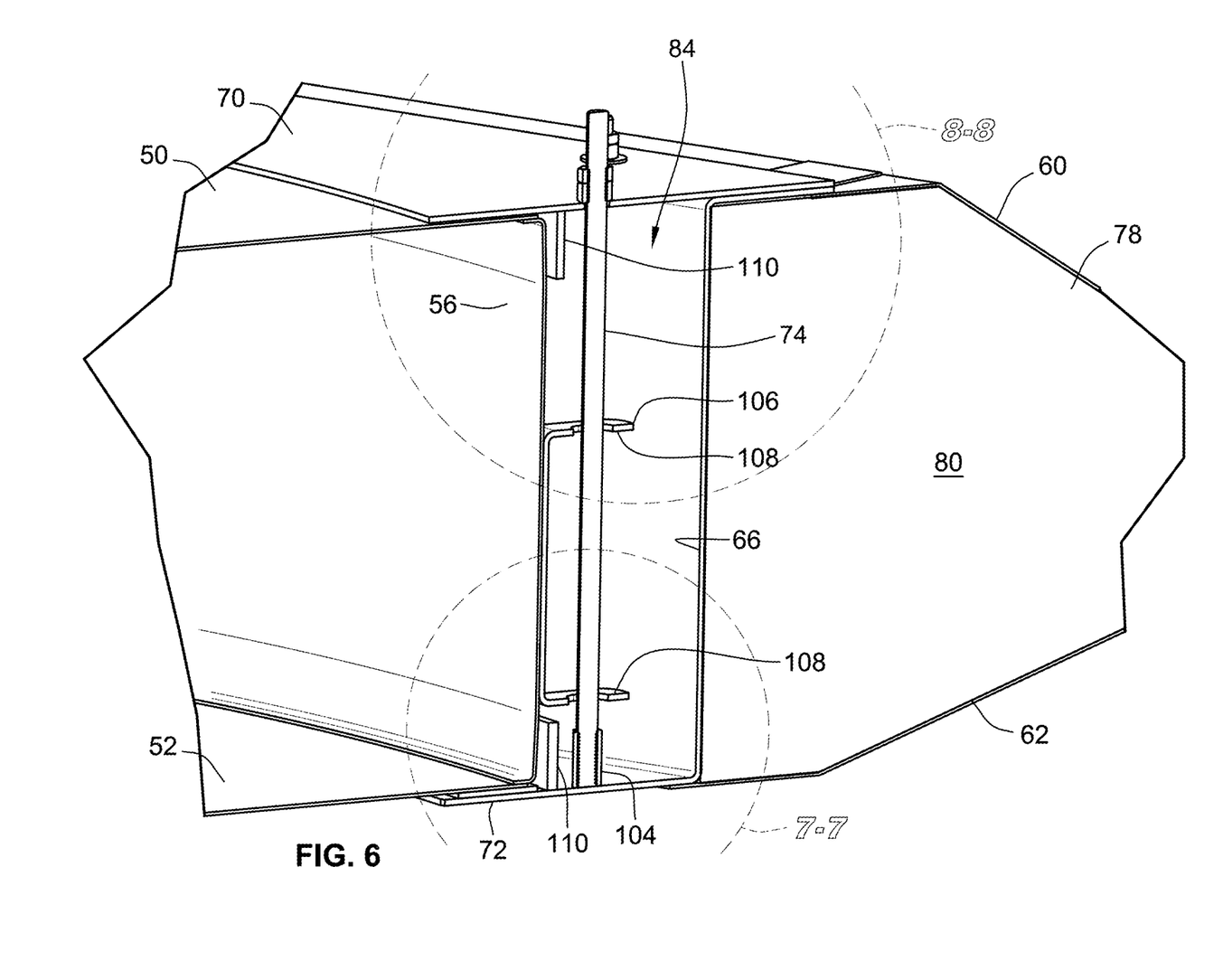
FIG. 6 is another perspective cross section of the mixer support assembly of FIG. 2, taken in the region of a clamping arrangement thereof.

Referring to FIG. 6, a radial space 84 is formed between a radially outwardly facing surface of sidewall 56 and a radially inwardly facing surface of sidewall 66. This radial space 84 is sized such that the at least one adjustment bolt 74 is situated within said radial space 84. As introduced above, a seal 76 (see FIG. 3) is utilized to prevent ingress of wastewater mixture 24 (see FIG. 1) and/or biogas into this region.

As may also be seen in view, float 78 assumes the general shape of float space 80 defined between upper and lower shrouds 60, 62 and sidewall 66. This close size approximation inhibits the collection of wastewater mixture 24 (see FIG. 1) and or biogas in this space which could otherwise affect buoyancy.

As mentioned above, clamping arrangement is formed by clamping plate 70, lower flange 72, and at least one adjustment bolt 74 which is mounted to lower flange 72 and extends upwardly as shown through clamping plate 70. The number of adjustment bolts 74 utilized is dependent upon the clamping force desired. While even a single adjustment bolt 74 could be utilized, it will be recognized that an evenly distributed number of adjustment bolts 74 in the region of radial space 84 allows for a more balanced clamping force.

Tightening of a nut associated with adjustment bolt 74 biases clamping plate 70 downwardly against top wall 50, which in turn biases the entirety of support body 40 (see FIG. 3) against lower flange 72, and more particularly seal 76 (see FIGS. 3 and 7) supported by lower flange 72. As a result, an axial clamping force is provided between clamping plate 70 and lower flange 72. Adjustment bolt 74 may be attached to lower flange 72 via any mechanical expedient. In the illustrated embodiment, a threaded stand 104 is attached to lower flange 72, and adjustment bolt 74 threads into threaded stand 104.

A bolt guide 106 may also be associated with each adjustment screw. Bolt guide 106 is affixed to sidewall 56 as shown and provides several slotted opening 108 through which adjustment bolt 74 passes through. These openings are slotted to account for any radial shifting of support body 40 (see FIG. 3) relative to float ring 42 (see FIG. 3). To this end, it is also contemplated that clamping ring 70 and lower flange 72 may be provided with radial walls 110 to limit such radial shifting.

Figure 7:
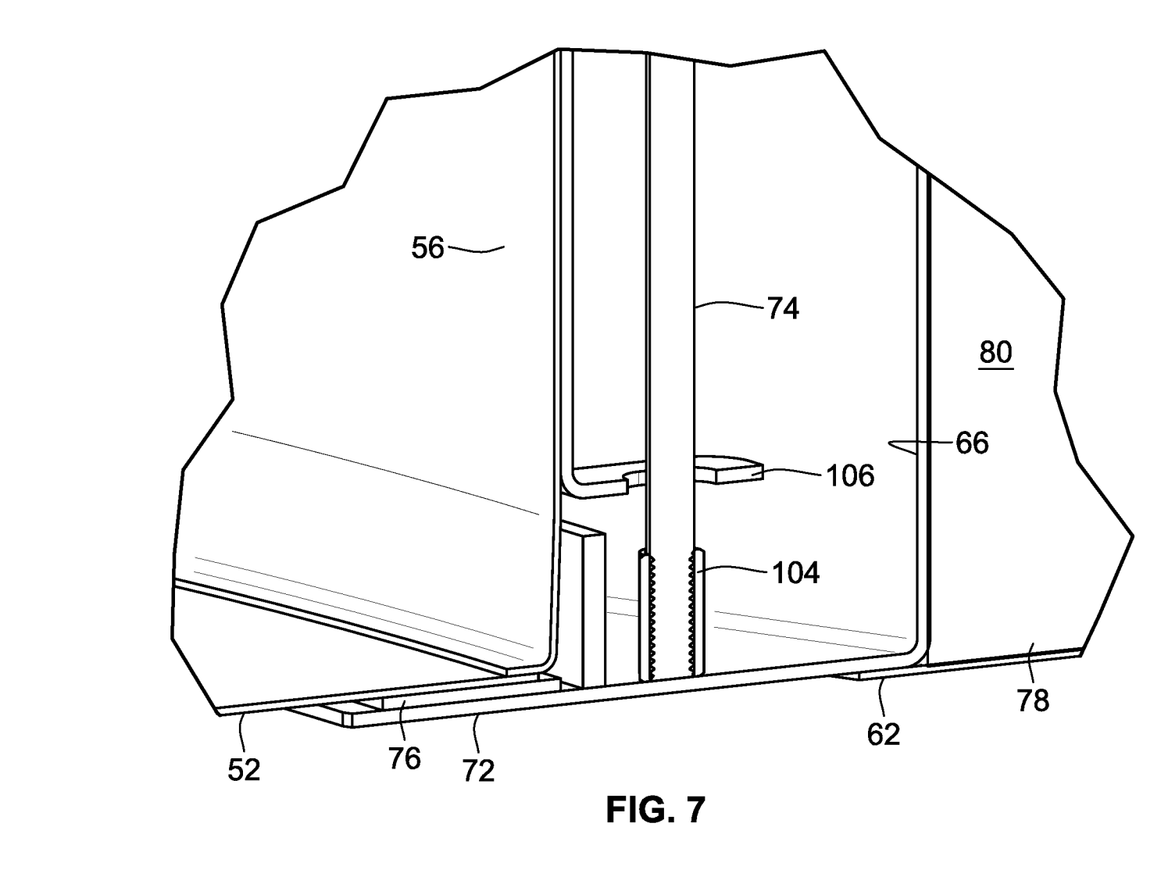
FIG. 7 is another perspective cross section of the mixer support assembly of FIG. 2, taken in the region of an axial seal thereof.

With reference now to FIG. 7, seal 76 is compressed between lower flange 72 and lower wall 52 is shown. Seal 76 may be embodied as a gasket as is shown, or may be any other type of seal sufficient to form a seal between the lower flange 72 and lower wall 50 (FIG. 6). To this end, either or both of lower flange 72 and lower wall 50 may include features for receiving a seal, e.g. grooves, tabs, etc. The above introduced overlap between lower flange 72 and a flange of lower shroud 62 may also be seen in this view.

Figure 8:
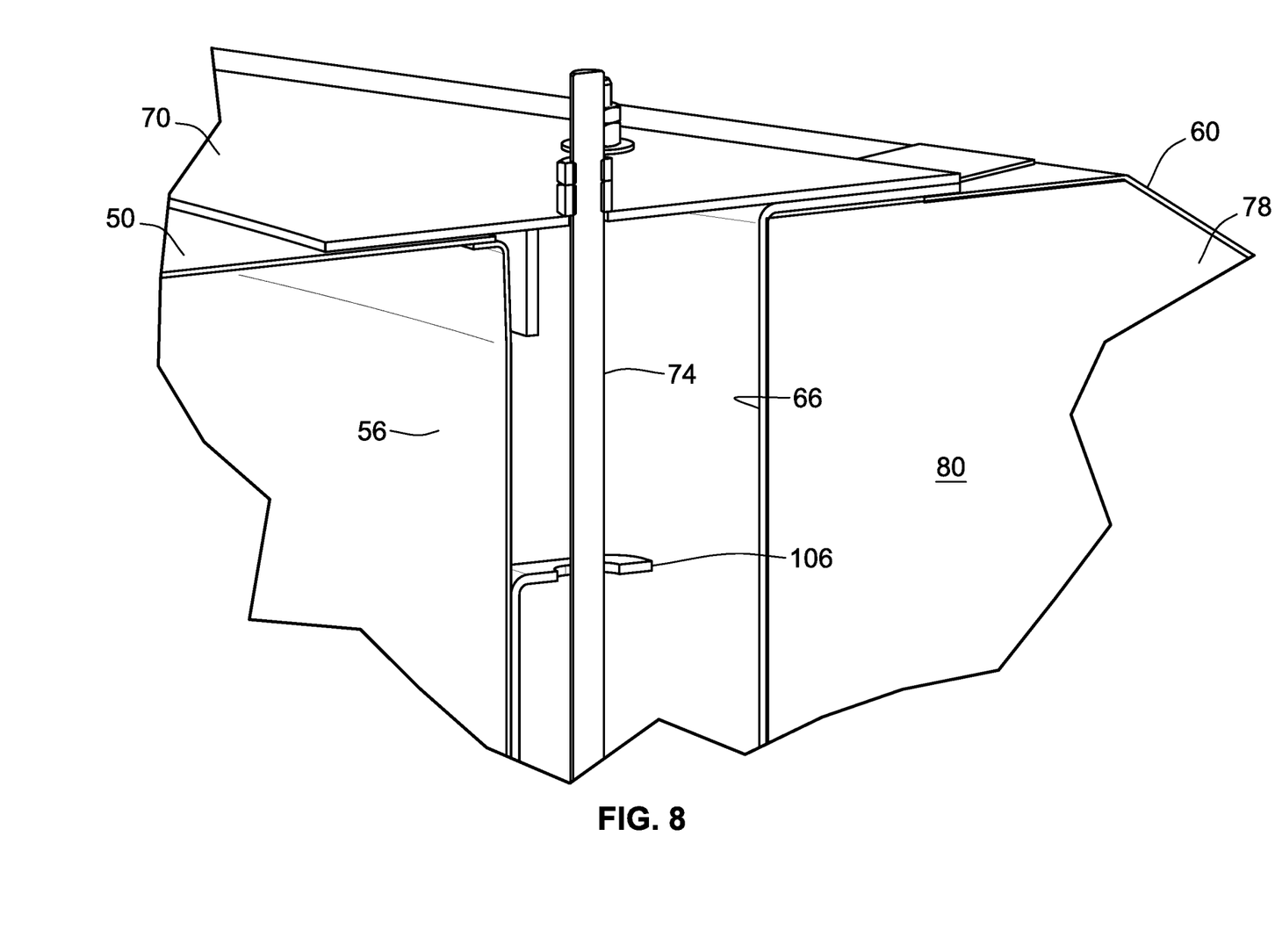
FIG. 8 is another perspective cross section of the mixer support assembly of FIG. 2, take in the region of a an upper extent of the clamping arrangement of FIG. 6.

Turning finally to FIG. 8, clamping ring 70 is illustrated relative to upper wall 50 and upper shroud 60. Although shown and described as a separate component, it is equally possible for clamping ring 70 to be permanently affixed to top wall 50 via welding, such that it forms a part of support body 40 (see FIG. 3). In either case, clamping ring 70 is mechanically attached to upper shroud 60 via fasteners as shown. Although a seal is not situated between clamping ring 70 and upper shroud 60, it is contemplated that one could be so as to provide a redundant seal in addition to that already provided by seal 76 as is shown in FIG. 7.

As already described above, and referring collectively to FIGS. 1-8, mixer 18 mounts to mixer support assembly 16 such that this connection is completely or substantially gas tight. The same holds true for the seal formed between seal 76 and support body 40, the joint formed between shroud 62 and flange 72, the connection of cover 14 to mixer support assembly 16 using bars 64, and the connection of cover 14 to sidewall 28 of tank 22. As a result, all potential leak paths from above cover 14 to underneath cover 14 are eliminated. In other words, the digester system 10 described herein advantageously provides a substantially or completely gas tight enclosure to facilitate collection of biogas generated under cover 14. A "substantially gas tight enclosure" as used herein is meant to alot for minor losses of biogas from under cover 14 to an exterior of cover 14 or minor ingress of air from above cover 14 to underneath cover 14 which do not impact the operation of digester system 10 in commercial applications as are conducted currently using prior designs.

Another advantage of the invention arises from the sizing of float ring 42. In particular, as discussed above, cover 14 attaches to a peripheral region of float ring 42. As a result, this region of connection to cover 14 is spaced radially from a center line of mixer 18 along which mixer arm 34 is aligned. This radial spacing allows for a decrease in the torsional forces exerted by mixer 18 on cover 14 through support body 40 and float ring 42, particularly at start up. The radial extension of the peripheral edge of float ring 42 relative to the centerline of mixer 18 may be increased or decreased by modifying the size and shape of float ring 42 to accommodate covers of different torsional rigidity. For example, a cover 14 made of a material having a relatively high torsional rigidity may be located closer to mixer 18, and hence the radial extension of float ring 42 may be decreased, thereby reducing its size, weight, and cost. Likewise, for covers made of a material having a relatively lower torsional rigidity, the radial extension of float ring 42 may be increased to decrease torsional loading at the interface of the cover 14 and float ring 42.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A mixer support assembly of an integrated cover and mixer apparatus for a digester system, the mixer support assembly comprising:
   a support body, the support body arranged for supporting a mixer;
   a float ring surrounding the support body, the float ring comprising at least one float and a sidewall, wherein the sidewall of the float ring includes an upper flange and a lower flange; and
   a clamping arrangement comprising the lower flange of the sidewall of the float ring and a clamping ring connected to the float ring, the clamping arrangement configured for applying a clamping force against the support body in an axial direction to clamp the float ring to the support body.

2. The mixer support assembly of claim 1, wherein the support body comprises an upper wall, a lower wall in spaced opposition to the upper wall, and a sidewall extending between the upper and lower walls, the upper wall, lower wall, and sidewall defining an interior space.

3. The mixer support assembly of claim 2, wherein the upper and lower walls each include an aperture, the apertures aligned with one another to define a passageway through the support body.

4. The mixer support assembly of claim 1, wherein the float ring comprises an upper shroud and a lower shroud, with the at least one float situated within a float space between the upper and lower shrouds, wherein the sidewall of the float ring encloses the at least one float between the upper and lower shrouds.

5. A mixer support assembly of an integrated cover and mixer apparatus for a digester system, the mixer support assembly comprising:
   a support body, the support body arranged for supporting a mixer;
   a float ring surrounding the support body, the float ring having at least one float;
   a clamping arrangement for applying a clamping force against the support body in an axial direction to clamp the float ring to the support body;
   wherein the float ring comprises an upper shroud and a lower shroud, with the at least one float situated within a float space between the upper and lower shrouds, and a sidewall enclosing the at least one float between the upper and lower shrouds; and
   wherein the sidewall of the float ring includes an upper flange and a lower flange, the upper flange connected to the upper shroud, the lower flange connected to the lower shroud.

6. The mixer support assembly of claim 5, wherein the clamping arrangement is formed by the lower flange of the sidewall of the float ring, a clamping ring, and at least one adjustment bolt for biasing the clamping ring towards the lower flange of the sidewall of the float ring, the at least one adjustment bolt connected to the lower flange of the sidewall of the float ring, wherein a peripheral region of the support body is interposed between the clamping ring and the lower flange of the sidewall of the float ring.

7. The mixer support assembly of claim 6, wherein the clamping ring is connected to the upper shroud of the float ring and biased against the upper wall of the support body via tightening of a nut on the at least one adjustment bolt.

8. The mixer support assembly of claim 7, further comprising a seal supported by the lower flange of the sidewall of the float ring, the seal positioned on the lower flange such that it is interposed between the lower flange of the sidewall of the float ring and the lower wall of the support body.

9. The mixer support assembly of claim 8, wherein tightening of the nut on the at least one adjustment bolt biases the lower flange of the sidewall of the float ring towards the lower wall and compresses the seal.

10. An integrated cover and mixer apparatus of an anaerobic digester system, the integrated cover and mixer apparatus comprising:
    a cover;
    a mixer;
    a mixer support assembly supporting the mixer, the mixer support assembly comprising:
      a support body, the support body including an aperture for passage of a portion of the mixer through the support body;
      a float ring surrounding the support body and supporting the support body in an axial direction, the cover attached to the float ring, the float ring comprising a sidewall, wherein the sidewall of the float ring includes an upper flange and a lower flange;
      a clamping arrangement formed between the float ring and the support body comprising the lower flange of the sidewall of the float ring and a clamping ring connected to the float ring; and
    wherein the support body is selectively removable from the float ring.

11. The integrated cover and mixer apparatus of claim 10, wherein the support body comprises an upper wall, a lower wall in spaced opposition to the upper wall, and a sidewall extending between the upper and lower walls, the upper wall, lower wall, and sidewall defining an interior space.

12. The integrated cover and mixer apparatus of claim 10, wherein the float ring comprises an upper shroud, a lower shroud, at least one float situated within a float space between the upper and lower shrouds, wherein the sidewalls of the float ring encloses the at least one float between the upper and lower shrouds.

13. An integrated cover and mixer apparatus o fan anaerobic digester system, the integrated cover and mixer apparatus comprising:
    a cover;
    a mixer;

a mixer support assembly supporting the mixer, the mixer support assembly comprising:
a support body, the support body including an aperture for passage of a portion of the mixer through the support body;
a float ring surrounding the support body and supporting the support body in an axial direction, the cover attached to the float ring;
a clamping arrangement formed between the float ring and the support body,
wherein the support body is selectively removable from the float ring;
wherein the float ring comprises an upper shroud, a lower shroud, at least one float situated within a float space between the upper and lower shrouds, and a sidewall enclosing the at least one float between the upper and lower shrouds; and
wherein the sidewall of the float ring includes an upper flange and a lower flange, the upper flange connected to the upper shroud, the lower flange connected to the lower shroud.

14. The integrated cover and mixer apparatus of claim 13, wherein the clamping arrangement is formed by the lower flange of the sidewall of the float ring, a clamping ring, and at least one adjustment bolt for biasing the clamping ring towards the lower flange of the sidewall of the float ring, the at least one adjustment bolt connected to the lower flange of the sidewall of the float ring, wherein a peripheral region of the support body is interposed between the clamping ring and the lower flange of the sidewall of the float ring.

15. The integrated cover and mixer apparatus of claim 14, wherein the clamping ring is connected to the upper shroud of the float ring and biased against the upper wall of the support body via tightening of a nut on the at least one adjustment bolt.

16. The integrated cover and mixer apparatus of claim 15, further comprising a seal supported by the lower flange of the sidewall of the float ring, the seal positioned on the lower flange such that it is interposed between the lower flange of the sidewall of the float ring and the lower wall of the support body.

17. The integrated cover and mixer apparatus of claim 16, wherein tightening of the nut on the at least one adjustment bolt biases the lower flange of the sidewall of the float ring towards the lower wall and compresses the seal.

18. A digester system, comprising:
a tank for containing a wastewater mixture, the tank having sidewall;
an integrated cover and mixer apparatus, the integrated cover and mixer apparatus comprising:
a cover attached to the sidewall of the tank;
a mixer support assembly, the mixer support assembly including a mixer support body and a float ring, the cover attached to the float ring;
a mixer supported by the mixer support assembly, wherein a portion of the mixer extends through the mixer support assembly and into a wastewater containment region of the tank;
wherein the mixer support assembly includes a removable support body, wherein the mixer and support body are selectively removable from a float ring of the mixer support assembly as a unit such that the float ring remains attached to the cover and the cover remains attached to the sidewall of the tank; and
wherein the float ring comprises an upper flange and a lower flange and a clamping arrangement comprising the lower flange and a clamping ring connected to the float ring.

19. The digester system of claim 18, wherein the clamping arrangement is configured for clamping the float ring to the support body.

20. The digester system of claim 19, wherein the digester system is substantially gas tight.

* * * * *

UNITED STATES PATENT AND TRADEMARK OFFICE
CERTIFICATE OF CORRECTION

PATENT NO. : 11,008,238 B2  
APPLICATION NO. : 15/926622  
DATED : May 18, 2021  
INVENTOR(S) : Thomas H. Probst Page 1 of 1

It is certified that error appears in the above-identified patent and that said Letters Patent is hereby corrected as shown below:

In the Claims

Claim 12, Column 10, Line 60, reads "wherein the sidewalls" should read --wherein the sidewall--

Claim 13, Column 10, Line 63, reads "mixer apparatus o fan anaero-" should read --mixer apparatus of an anaero- --

Signed and Sealed this  
Twenty-ninth Day of June, 2021

Drew Hirshfeld  
*Performing the Functions and Duties of the*  
*Under Secretary of Commerce for Intellectual Property and*  
*Director of the United States Patent and Trademark Office*